United States Patent [19]

Conley

[11] 3,991,044

[45] Nov. 9, 1976

[54] PROCESS FOR IMPROVING LIGHTFASTNESS OF AN AZO PIGMENT BY HEAT TREATMENT

[75] Inventor: Joseph William Conley, Fort Edward, N.Y.

[73] Assignee: Hercules Incorporated, Wilmington, Del.

[22] Filed: Sept. 26, 1972

[21] Appl. No.: 292,361

[52] U.S. Cl. .......................... 260/176; 106/288 Q; 106/308 Q; 260/193; 260/208
[51] Int. Cl.$^2$ .................... C08H 17/14; C09B 67/00
[58] Field of Search ................. 260/193, 208, 176; 106/288 Q, 308 Q

[56] References Cited
UNITED STATES PATENTS

| | | | |
|---|---|---|---|
| 3,004,821 | 10/1961 | Gano | 260/191 X |
| 3,056,642 | 10/1962 | Kesler et al. | 260/208 X |
| 3,124,565 | 3/1964 | Schilling et al. | 260/157 |
| 3,169,955 | 2/1965 | Siebert et al. | 260/176 |
| 3,356,443 | 12/1967 | Dziomba | 260/208 X |
| 3,555,003 | 1/1971 | Ribka | 260/157 |
| 3,575,957 | 4/1971 | Demler et al. | 260/163 |
| 3,759,733 | 9/1973 | Bradley et al. | 106/309 |
| 3,775,148 | 11/1973 | Bradley | 106/288 Q |
| 3,785,843 | 1/1974 | Ribka et al. | 106/288 Q |

*Primary Examiner*—Floyd D. Higel
*Attorney, Agent, or Firm*—Hazel L. Deming

[57] ABSTRACT

A process for improving the light-fastness of pigments of the Hansa Yellow and Diarylide Yellow class is described. Azo pigments prepared by coupling diazotized primary aromatic monoamines or tetrazotized primary aromatic diamines with acetoacetarylides in aqueous medium in the absence of surfactants are heated prior to or after separation from the aqueous medium at 120° to about 250° C. until the pigment is converted to crystalline particles having an average particle diameter at least twice that of the pigment which has not been heat treated.

4 Claims, No Drawings

PROCESS FOR IMPROVING LIGHTFASTNESS OF AN AZO PIGMENT BY HEAT TREATMENT

This invention relates to a process for the manufacture of azo pigments having improved lightfastness.

Essentially all commercially important yellow azo pigments belong to either the so-called Hansa Yellow class, members of which are prepared by diazotizing aniline derivatives and coupling with an acetoacetarylide, or to the so-called Diarylide Yellow class, members of which are prepared by tetrazotizing 3,3'-dichlorobenzidine and coupling with an acetoacetarylide. In general, the Diarylide Yellows have poorer lightfastness than the Hansa Yellows. However, even the Hansa Yellows do not possess satisfactory lightfastness to warrant extensive use in exterior coating applications.

Thus it is the principal object of this invention to provide a process for improving the lightfastness of Hansa Yellow and Diarylide Yellow type pigments.

In accordance with the present invention, the above and other objects are accomplished by a process which comprises forming an azo pigment by coupling a diazonium compound of an aromatic amine with an acetoacetarylide in aqueous medium in the absence of surfactants and then heating the azo pigment at a temperature of at least 120° C. but below the decomposition temperature of the pigment until the pigment is converted to crystalline particles having an average particle diameter at least twice that of a chemically identical azo pigment which has not been heat treated.

The azo pigments which are heated in accordance with the process of the invention are produced by coupling a diazotized primary aromatic monoamine or a tetrazotized primary aromatic diamine devoid of water-solubilizing groups such as carboxylic or sulfonic acid groups with a coupling component devoid of solubilizing groups and having an active methylene group. Preferred coupling compounds of this type are the acetoacetarylides having the formula

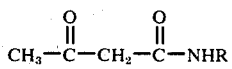

where R is an aryl nucleus which can be substituted by one or more alkyl, alkoxy, halo or nitro groups, and the biacetoacetarylides. Preferred acetoacetarylides include acetoacetortho-anisidide, acetoacet-para-toluidide, 1-acetoacetylamino-2-chlorobenzene, acetoacetanilide, 1-acetoacetylamino-2,4-dimethylbenzene, 1-acetoacetylamino-2,5-dimethoxybenzene, 1-acetoacetylamino-4-chloro-2,5-dimethoxybenzene and 4,4'-bis-ortho-acetoacetotoluidide.

Typical aromatic amines which can be diazotized and employed as the diazo compound for reaction with the above mentioned coupling components include 2-chloro-4-nitroaniline, 2-nitro-4-chloroaniline, 5-chloro-2-aminotoluene, 2-methoxy-4-nitroaniline, 3-nitro-4-aminotoluene, 2,4-dichloroaniline, 3,3'-dichlorobenzidine, 3,3'-dimethoxybenzidine and 3-amino-4-methoxybenzanilide.

The coupling is carried out in known manner and is effected by adding an aqueous solution of the diazo component to an aqueous suspension of the acetoacetarylide at about 0° to about 40° C. over a period of about 30 to about 120 minutes and then adjusting the pH of the resulting color slurry to a pH from about 4 to about 7.5.

The present invention is based on the discovery that azo pigments having improved lightfastness can be obtained by heating an azo pigment prepared in the absence of surfactants at a temperature of at least 120° C. but below the decomposition temperature of the pigment for a sufficient period of time to produce a pigment form which is crystalline particles having an average particle diameter at least twice that of conventionally processed pigments. By average particle diameter is meant the limits of the central 60% of the entire range of pigment particle diameters which occur in a bell-shaped Gaussian distribution curve when measurements are made on electron micrographs of pigments dispersed in a nitrocellulose film matrix.

The azo pigment which is heated in accordance with this invention can be a slurry of the pigment in the aqueous medium in which it is formed, or a filter or press cake of the pigment or a previously dried filter or press cake of the pigment. The heating can be carried out in any convenient manner and, if desired, under pressure. The time required to convert the pigment particles to the desired crystalline form will vary, of course, depending upon the manner and conditions of heating with longer times being required at the lower temperatures. Preferably, the heating is carried out at from 120° C. to about 250° C. for about 1 to about 40 hours, and more preferably at from 120° C. to about 220° C. for about 1 to about 24 hours.

The azo pigment can be recovered from the color slurry in any known manner for separating a solid from a liquid, such as by decantation, filtration, centrifugation, and the like.

The products of the invention are yellow to orange pigments having particles with an average particle diameter at least twice that of chemically identical pigments, which have not been heat-treated but have been processed conventionally, i.e., by boiling and/or drying at temperatures of about 100° C. or below. The pigments are of value in numerous applications but have particular value in interior and exterior coating applications.

The invention is further illustrated by reference to the following examples in which all parts and percentages are by weight unless otherwise specified.

EXAMPLE 1

In a vessel 17.25 parts of 2-nitro-4-chloroaniline are slurried in 100 parts of water. To this slurry is added 58 parts of hydrochloric acid (29.3%) and the slurry is cooled with ice to 5° C. after which 8 parts of sodium nitrite are next added and diazotization is completed by stirring for 2 hours at 10° C. The excess of nitrite is then destroyed by adding an appropriate amount of sulfamic acid.

In a separate vessel 21.7 parts of aceto-acet-orthoanisidide are dissolved in 250 parts of water at 25° C. containing 4.5 parts of sodium hydroxide. The solution is diluted to 1500 parts with water at 15° C. for striking, 27 parts of sodium acetate are added and the whole is made acid to litmus by adding 10.6 parts of acetic acid (70%).

Coupling is effected by adding the diazo solution to the suspension of the aceto-acet-ortho-anisidide over a period of 30 minutes. The color slurry is then adjusted to a pH of 7.5 with sodium hydroxide and the slurry is transferred to a pressure vessel equipped with a temperature control. The vessel is sealed and the contents are heated rapidly to 100° C. and then slowly to 121° C. The vessel contents are maintained at 121° C. under about 10 p.s.i.g. for 1 hour after which time the pressure is released and the contents cooled. The resulting color slurry is filtered and the pigment color is washed, then dried for 20 hours at 82° C. and finally hammer-milled to give a yellow pigment having crystalline particles which by electron micrographic examination have an average particle diameter ranging from 0.4 to 3.0 microns.

Lightfastness of the pigment of this example and a control pigment are compared in paints applied to cedar panels and exposed to outdoor weathering in Florida. The control pigment is prepared in the same manner as the example except that after coupling the color slurry is heated to the boil, boiled for 15 minutes and then filtered, following which the pigment color is washed, dried at 82° C. for 20 hours and then hammer-milled. The average particle diameter of the control pigment particles ranged from 0.2 to 0.6 micron. The paints used in the evaluations are prepared by milling the following ingredients for 3 passes on a 3-roll mill at 300 p.s.i. and one pass at 400 p.s.i.:

0.5 part of pigment
1.0 part of Universal Vehicle (California Ink Co.)

The above formulation is reduced with a white-pigmented acrylic latex paint base, the pigment to white base ratio being adjusted to provide reduced pigment formulations of equal intensity when comparing the pigment of this example and the control pigment on the same substrate. The paints so prepared are brushed onto primed 2½" × 9" red cedar panels and the panels (with partial masking) are exposed to outdoor weathering in Florida. After three mouths of exposure, the panels covered with the paints prepared from the pigment of this example show less fading than the control panels.

EXAMPLE 2

The procedure of Example 1 is repeated except that in this example the color slurry after adjustment of the pH to 7.5 is heated to the boil, boiled for 15 minutes, cooled, and filtered to give a ¾ inch thick filter cake which is washed and then dried for 20 hours at 121° C. Examination of the hammer-milled pigment by electron micrography shows an average particle diameter distribution such that greater than 60% lie in the range of 0.4 to 1.5 microns. The particles of the pigment of this example are crystalline. Evaluation of the pigment for lightfastness according to the procedure of Example 1 shows improved fade resistance as compared with a control pigment prepared in the same manner except that drying of the filter cake is carried out 20 hours at 82° C.

EXAMPLE 3

The procedure of Example 2 is repeated except that the filter cake is dried for 30 hours at 82° C. and then for 24 hours at 121° C. The pigment of this example is identical to and exhibits the same degree of lightfastness as the pigment of Example 2.

EXAMPLE 4

The procedure of Example 2 is repeated except that the color slurry is prepared by coupling a tetrazotized solution of 1 mole of 3,3'-dichlorobenzidine with a suspension of 2 moles of aceto-acet-ortho-anisidide, and the drying temperature is 204° C. The pigment particles of this example are crystalline and exhibit a range of particle sizes twice that of a control prepared in the same manner except that the drying temperature is 82° C. The pigment exhibits excellent lightfastness when evaluated according to Example 1 and shows less fading than the control.

EXAMPLE 5

The procedure of Example 4 is repeated except that an equivalent amount of aceto-acet-para-toluidide is substituted for the aceto-acet-ortho-anisidide. The pigment particles of this example are crystalline and have an average particle diameter ranging from 0.25 to 0.75 micron. The pigment exhibits excellent lightfastness when tested for 3 months outdoors in Florida, according to the procedure of Example 1. A control pigment prepared in the same manner except that the drying temperature is 82° C. has greater than 60% of its particles in the range of 0.1 to 0.2 micron.

What I claim and desire to protect by Letters Patent is:

1. A process for improving the lightfastness of an azo pigment formed by coupling a diazonium compound selected from the group consisting of diazotized 2-chloro-4-nitroaniline, diazotized 2-nitro-4-chloroaniline, diazotized 5-chloro-2-aminotoluene, diazotized 2-methoxy-4-nitroaniline, diazotized 3-nitro-4-aminotoluene, diazotized 2,4-dichloroaniline, tetrazotized 3,3'-dichlorobenzidine, tetrazotized 3,3'-dimethoxybenzidine and tetrazotized 3-amino-4-methoxybenzanilide with an aceto-acet-arylide having the formula

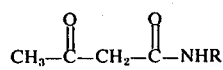

where R is aryl or aryl substituted by alkyl, alkoxy, halo or nitro, which process consists of carrying out the coupling in aqueous medium in the absence of any surfactants, adjusting the pH of the aqueous medium to a pH from about 4 to about 7.5 and then heating said azo pigment, either prior to or following separation from said aqueous medium at a temperature ranging from 120° C. to about 250° C. but below the decomposition temperature of the pigment until the pigment is converted to crystalline particles having an average particle diameter at least twice that of a chemically identical azo pigment which has not been heat treated.

2. The process of claim 1 wherein the azo pigment, prior to heating, is separated from the aqueous medium in which it is formed.

3. The process of claim 2 wherein the diazonium compound id diazotized 2-nitro-4-chloroaniline and the aceto-acet-arylide is aceto-acet-ortho-anisidide.

4. The process of claim 2 wherein the diazonium compound is tetrazotized 3,3'-dichlorobenzidine and the aceto-acet-arylide is aceto-acet-ortho-anisidide.

* * * * *